United States Patent
Garimella et al.

(10) Patent No.: US 12,269,462 B1
(45) Date of Patent: Apr. 8, 2025

(54) SPATIAL PREDICTION

(71) Applicant: Zoox, Inc., Foster City, CA (US)

(72) Inventors: Gowtham Garimella, Burlingame, CA (US); Marin Kobilarov, Mountain View, CA (US); Kai Zhenyu Wang, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 462 days.

(21) Appl. No.: 16/820,378

(22) Filed: Mar. 16, 2020

(51) Int. Cl.
*B60W 30/00* (2006.01)
*B60W 30/06* (2006.01)
*B62D 15/02* (2006.01)
*G06N 3/08* (2023.01)

(52) U.S. Cl.
CPC ......... *B60W 30/06* (2013.01); *B62D 15/0285* (2013.01); *G06N 3/08* (2013.01)

(58) Field of Classification Search
CPC ...... B60W 30/06; B62D 15/0285; G06N 3/08
See application file for complete search history.

(56) References Cited

U.S. PATENT DOCUMENTS

| | | | | |
|---|---|---|---|---|
| 9,248,834 | B1 * | 2/2016 | Ferguson | B60W 30/09 |
| 9,517,767 | B1 * | 12/2016 | Kentley | B60W 30/08 |
| 9,612,123 | B1 | 4/2017 | Levinson et al. | |
| 10,353,390 | B2 | 7/2019 | Linscott et al. | |
| 10,421,453 | B1 * | 9/2019 | Ferguson | B60W 30/09 |
| 2017/0120803 | A1 * | 5/2017 | Kentley | B60Q 1/26 |
| 2019/0101924 | A1 * | 4/2019 | Styler | G05D 1/0214 |
| 2019/0243371 | A1 * | 8/2019 | Nister | G05D 1/0214 |
| 2019/0382007 | A1 * | 12/2019 | Casas | B60W 30/0956 |
| 2020/0074266 | A1 * | 3/2020 | Peake | G06N 3/006 |
| 2020/0086863 | A1 * | 3/2020 | Rosman | B60W 30/0956 |
| 2021/0031762 | A1 * | 2/2021 | Matsunaga | B60W 30/095 |
| 2021/0064040 | A1 * | 3/2021 | Yadmellat | G05D 1/0212 |
| 2021/0188316 | A1 * | 6/2021 | Marchetti-Bowick | B60W 60/0011 |
| 2021/0197813 | A1 * | 6/2021 | Houston | B60W 30/143 |
| 2021/0253132 | A1 * | 8/2021 | Coimbra De Andrade | B60W 60/0051 |
| 2021/0261116 | A1 * | 8/2021 | Hosokawa | B60W 30/08 |
| 2021/0276587 | A1 * | 9/2021 | Urtasun | B60W 60/001 |

OTHER PUBLICATIONS

H.-S. Jeon, D.-S. Kum and W.-Y. Jeong, "Traffic Scene Prediction via Deep Learning: Introduction of Multi-Channel Occupancy Grid Map as a Scene Representation," 2018 IEEE Intelligent Vehicles Symposium (IV), Changshu, China, 2018, pp. 1496-1501, doi: 10.1109/IVS.2018.8500567. (Year: 2018).*

(Continued)

*Primary Examiner* — Russell Frejd
*Assistant Examiner* — Brittany Renee Peko
(74) *Attorney, Agent, or Firm* — Lee & Hayes, P.C.

(57) ABSTRACT

Techniques relating to determining regions based on intents of objects are described. In an example, a computing device onboard a first vehicle can receive sensor data associated with an environment of the first vehicle. The computing device can determine, based on the sensor data, a region associated with a second vehicle proximate the first vehicle that is to be occupied by the second vehicle while the vehicle performs a maneuver. Further, the computing device can determine an instruction for controlling the first vehicle based at least in part on the region.

20 Claims, 5 Drawing Sheets

(56) References Cited

OTHER PUBLICATIONS

U.S. Appl. No. 15/982,658, filed May 17, 2018, Lee, et al. "Vehicle Lighting State Determination", 40 pages.
U.S. Appl. No. 16/420,050, filed May 22, 2019, Hong et al., "Trajectory Prediction on Top-Down Scenes and Associated Model", 60 pages.
U.S. Appl. No. 16/504,147, filed Jul. 5, 2019, Garimella et al., "Prediction on Top-Down Scenes Based on Action Data", 51 pages.
U.S. Appl. No. 16/709,263, filed Dec. 19, 2019, Thalman et al., "Determining Bias of Vehicle Axles", 39 pages.
U.S. Appl. No. 16/803,644, filed Feb. 27, 2020, Haggblade, et al., "Perpendicular Cut-In Training", 40 pages.
U.S. Appl. No. 16/803,705, filed Feb. 27, 2020, Haggblade, et al., "Perpendicular Cut-In Detection", 39 pages.

\* cited by examiner

SPATIAL PREDICTION

BACKGROUND

In general, prediction systems utilize information associated with objects in an environment to infer future actions of the objects, such as trajectories. Such information can then be used to determine how to control a vehicle, for example, in the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
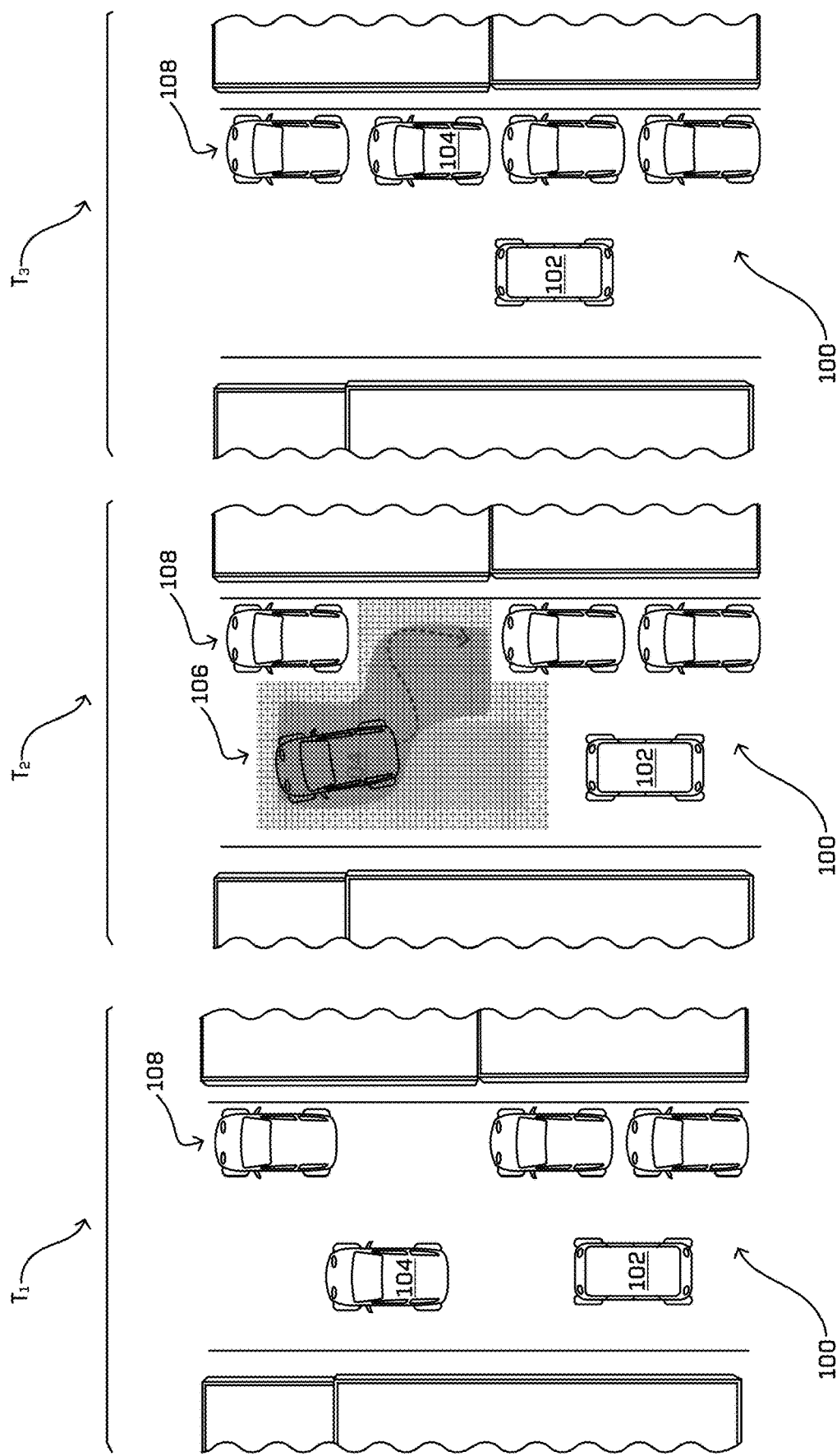
FIG. 1 illustrates an example environment for predicting a region to be occupied by a vehicle while performing a maneuver, as described herein.

Techniques described herein are directed to determining regions within an environment that are likely to be occupied by objects based on intents of the objects. Further, techniques include blocking such regions in the environment to enable other objects, such as autonomous vehicles, in the environment to determine how to maneuver within the environment while providing sufficient space for the objects to safely perform their maneuvers. That is, techniques described herein are directed to blocking regions based on object intent to enable autonomous vehicles and/or other objects to safely maneuver in an environment.

Further, techniques described herein are directed to training a model, using machine-learning techniques, to output a region that is likely to be occupied by an object while an object performs a maneuver (which can also be referred to as an "action" herein). Such a model can be used by computing device(s) onboard a vehicle, such as an autonomous vehicle, to determine how to control the autonomous vehicle. For example, computing device(s) onboard an autonomous vehicle can predict an intent of another vehicle proximate the autonomous vehicle and can leverage the model to predict a region that is likely to be occupied by the other vehicle while the other vehicle performs a maneuver associated with the predicted intent. The region can be a representation of space that is likely to be occupied by (or otherwise associated with) the other vehicle while the other vehicle performs the maneuver (i.e., for an entirety of a time that the other vehicle performs the maneuver). Such a region can be "blocked" such that the autonomous vehicle can be controlled to not enter the region, and to safely navigate in the environment in view of the blocked region.

For example, if computing device(s) onboard an autonomous vehicle detect another vehicle and predict that the other vehicle is associated with a parallel parking intent (e.g., to perform a parallel parking maneuver), a three-point turn intent (e.g., to perform a three-point turn maneuver), a perpendicular cut-in intent (e.g., to perform a perpendicular cut-in maneuver, which can include u-turns, k-turns, n-point turns, reversing maneuvers, etc.), or the like, the computing device(s) onboard the autonomous vehicle can leverage the model described above to determine an output indicative of a region of space that is likely to be occupied by the other vehicle while the other vehicle performs the parallel parking maneuver, the three-point turn maneuver, the perpendicular cut-in maneuver, or the like. The computing device(s) onboard the autonomous vehicle can therefore use the output to determine how to navigate the autonomous vehicle so as to safely maneuver the autonomous vehicle, as well as to provide sufficient space for the other vehicle to perform the maneuver so as not to block traffic. That is, the autonomous vehicle can utilize the model to (i) predict a region of space that is likely to be occupied by the other vehicle (which may include areas associated with multiple trajectories the other vehicle is to follow) and (ii) determine, based at least in part on the region of space, a trajectory to navigate the autonomous vehicle to accommodate the other vehicle such that both vehicles are able to perform their respective maneuvers. Such a trajectory, or instructions associated therewith (e.g., when executed), can cause the autonomous vehicle to decelerate thereby increasing a follow distance between the autonomous vehicle and another vehicle, cause the autonomous vehicle to yield to the other vehicle and/or stop, cause the autonomous vehicle to perform a lane change maneuver, cause the autonomous vehicle to safely maneuver around the other vehicle, and/or cause the autonomous vehicle to perform any other combination of maneuvers the autonomous vehicle is capable of performing. Furthermore, in some examples, detection of such a region can prompt the vehicle to call or otherwise reach out to a remote operator for assistance.

As described above, techniques described herein can be useful for prediction problems associated with intents and associated maneuvers that are complex and longer-term such that time-based prediction may be inadequate. That is, for complex maneuvers such as parallel parking maneuvers, three-point turn maneuvers, perpendicular cut-in maneuvers, and the like, the timing of when a vehicle is going to be in a particular position may be insufficient for adequately predicting the behavior of the vehicle, while relying on a spatial estimate (e.g., a region to avoid) may allow both vehicles to perform their respective maneuvers. Furthermore, maps associated with environments of the vehicle may not be accurate and/or useful for predicting future behavior of the vehicle. As such, existing prediction techniques may be insufficient for detecting and safely maneuvering around such vehicles. However, in such examples, knowing regions of space that the vehicle is likely to occupy while the vehicle performs such maneuvers can assist an autonomous vehicle in determining how to safely maneuver (and allowing other vehicles to perform their maneuvers). That is, techniques described herein are directed to a technical solution to the technical problem presented by limitations of existing prediction techniques. By training one or more models to predict regions of space likely to be occupied by vehicles (or other objects) performing longer-term, complex maneuvers, techniques described herein offer improvements to existing prediction techniques, thereby improving prediction accuracy and safety in environments associated with autonomous vehicles.

The techniques described herein can be implemented in a number of ways. Example implementations are provided below with reference to the following figures. Example implementations are discussed in the context of autonomous vehicles; however, the methods, apparatuses, and components described herein can be applied to a variety of components (e.g., a sensor component or a robotic platform), and are not limited to autonomous vehicles. In one example, the techniques described herein may be utilized in driver-controlled vehicles in which such a component may provide an indication to a driver of the vehicle of whether it is safe to perform various maneuvers. In another example, the techniques can be utilized in an aviation or nautical context, or in any component involving objects or entities that may be associated with behavior that is unknown to the component. In some examples, the techniques can be utilized in contexts outside of autonomous vehicles and/or prediction components. Furthermore, the techniques described herein can be used with real data (e.g., captured using sensor(s)), simulated data (e.g., generated by a simulator), or any combination of the two.

FIG. 1 illustrates an example environment 100 for predicting a region to be occupied by a vehicle while performing a maneuver, as described herein. The environment 100 is depicted at three instances of time: (i) $T_1$, which corresponds to a time at which a vehicle 102 determines an intent associated with another vehicle 104, (ii) $T_2$, which corresponds to a time at which the vehicle 102 determines a region 106 based at least in part on the intent, and (iii) $T_3$, which corresponds to a time after which the other vehicle 104 has completed a maneuver associated with the intent.

In at least one example, the vehicle 102 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 102 can be configured to control all functions from start to stop, including all parking functions, it can be unoccupied. This is merely an example, and the components and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 102 is an autonomous vehicle; however, the vehicle 102 could be any other type of vehicle.

In at least one example, the vehicle 102 can include one or more computing devices, which can be onboard the vehicle 102. In at least one example, the computing device(s) can include components for controlling the vehicle 102. Additional details associated with the vehicle 102 and the computing device(s) and/or component(s) associated therewith are described below with reference to FIG. 3.

In at least one example, a perception component associated with the computing device(s) onboard the vehicle 102 can perform object detection, segmentation, and/or classification based at least in part on sensor data received from sensor component(s) of the vehicle 102. In at least one example, the perception component can detect the other vehicle 104 in the environment 100 proximate to the vehicle 102. That is, the perception component can detect the other vehicle 104 is within a threshold distance of the vehicle 102 (e.g., such that the vehicle 104 may influence the motion of the vehicle 102).

As described above, the vehicle 102 can be associated with one or more sensor components. In at least one example, the sensor component(s) can include lidar sensors, radar sensors, ultrasonic transducers, sonar sensors, location sensors (e.g., global positioning component (GPS), compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), time of flight (ToF) sensors, etc. Such sensor data can include, but is not limited to, lidar data, radar data, ultrasonic transducer data, sonar data, location data (e.g., global positioning component (GPS), compass, etc.), inertial data (e.g., inertial measurement units data, accelerometer data, magnetometer data, gyroscope data, etc.), camera data (e.g., RGB data, IR data, intensity data, depth data, etc.), wheel encoder data, microphone data, environment sensor data (e.g., temperature sensor data, humidity sensor data, light sensor data, pressure sensor data, etc.), ToF sensor data, etc.

In at least one example, the computing device(s) onboard the vehicle 102 can include a prediction component, which can receive sensor data from the sensor component(s), map data associated with a map (e.g., of the environment 100), and/or perception data output from the perception component (e.g., processed sensor data). The perception component can receive such data and can output predictions associated with one or more objects within the environment 100 of the vehicle 102.

In at least one example, and at the first instance of time ($T_1$), the prediction component can predict an intent associated with the other vehicle 104. In at least one example, the prediction component can receive map data, sensor data, perception data, etc., as described above, and can generate a multi-channel image that represents a top-down view of the environment 100. In at least one example, a channel can represent map data. In at least one example, a channel can represent sensor output or information based on a sensor output that is modeled in a top-down representation. For instance, in at least one example, a channel can represent perception data. Further, in at least one example, a channel can represent a feature, characteristic, or other data associated with the environment 100 and/or the other vehicle 104. Such features, characteristics, or other data can include, but are not limited to, a position of the other vehicle 104, an instantaneous velocity associated with the other vehicle 104, an instantaneous velocity of the other vehicle 104, an indication of whether a driver is in the other vehicle 104, an indication of a direction the driver is looking (e.g., head position of the driver), a wheel angle associated with wheel(s) of the other vehicle 104 (additional details for determining such are described in U.S. patent application Ser. No. 16/709,263, which was filed on Dec. 10, 2019, and is incorporated by reference herein in its entirety), an indication of whether a brake light of the other vehicle 104 is illuminated, an indication of whether a headlight of the other vehicle 104 is illuminated, an indication of whether a reverse light of the other vehicle 104 is illuminated, an indication of whether a blinker of the other vehicle 104 is illuminated, a lighting state of the other vehicle 104, and/or the like. Additional details for determining vehicle lighting states are described in U.S. patent application Ser. No. 15/982,658, which was filed on May 17, 2018, and is incorporated by reference herein in its entirety.

In at least one example, the multi-channel image can comprise any number of channels, and each channel can represent a top-down representation of the environment 100 that, when aggregated, represent the same portion of the environment 100. The channel(s) can be input into a model, such as a multi-layer model, a convolutional neural network, a recurrent neural network, or the like, to predict an intent of the other vehicle 104. Additional details associated with such neural networks, and predicting intents of objects, are described in U.S. patent application Ser. No. 16/420,050, which was filed on May 22, 2019, and U.S. patent application Ser. No. 16/504,147, which was filed on Jul. 5, 2019, the entire contents of both of which are incorporated by reference herein. Of course, though described above with respect to a multi-channel image, any number of multi-channel images (which may represent a series of time prior to the most recent time step) and/or any other data structure are contemplated herein. Furthermore, while a single model is referenced above, the channel(s) can be input into any number of models or a single model with multiple layers and/or heads.

In at least one example, the prediction component can determine that the intent associated with the other vehicle 104—which, in FIG. 1, is associated with a parallel parking maneu—er-is an intent for which spatial prediction is preferred. In some examples, spatial prediction can be performed for all detected intents, or otherwise regardless of intent, and thus all objects in an environment of the vehicle 102. In other examples, spatial prediction may be performed for some detected intents but not for others. That is, spatial prediction may not be preferred for all intents and as such, techniques described herein may not be applicable for some detected intents. As such, spatial prediction—and regions associated therewith—can be conditioned on detecting an intent wherein spatial prediction is preferred. For intents where spatial prediction is preferred (e.g., intents associated with complex, longer-term maneuvers), the prediction component can utilize a model or multiple models—trained via machine-learning mechanisms, as described herein—to determine a region of space (e.g., a "region") that is likely to be occupied by the other vehicle while the other vehicle performs a maneuver associated with the predicted intent. That is, the region can indicate a portion of the environment 100 that is likely to be occupied by the other vehicle for an entirety of time that the other vehicle performs the maneuver.

As described above, in some examples, the prediction component can leverage model(s), trained by machine learning mechanism(s), to output an indication of a region. In at least one example, the indication can comprise an occupancy grid comprising individual tiles that are associated with confidence scores of whether respective portions of the environment are likely to be occupied by another vehicle while the other vehicle performs the maneuver. In some examples, the occupancy grid can be associated with different colors, tints, shades, or other indications to graphically represent different confidence scores. In some examples, the occupancy grid can be centered on the other vehicle 104, which may or may not align with the map of the environment 100.

As illustrated at the second instance of time $(T_2)$, the prediction component can output an indication of the region 106, which can correspond to the parallel parking maneuver to be performed by the other vehicle 104. That is, the region 106 can indicate the space, or portion of the environment 100, that is likely to be occupied by, or otherwise associated with, the other vehicle 104 while the other vehicle 104 performs the parallel parking maneuver into a vacant parking space among a plurality of parked vehicles 108. For illustrative purposes, the occupancy grid in FIG. 1 depicts confidence scores in a first range and/or above a first threshold as a first shade, confidence scores in a second range and/or below the first threshold but above a second threshold in a second (lighter) shade, and confidence scores in a third range and/or below the second threshold in a third (lightest) shade.

In some examples, the confidence scores, and corresponding tile shading, can be determined based on predicted intents associated with the other vehicle 104. That is, if a parallel parking intent is associated with a highest confidence score, tiles associated with a parallel parking maneuver can be the darkest tiles. However, if one or more other intents are also associated with confidence scores that meet or exceed a threshold, but are less than the confidence score associated with the parallel parking intent, tiles associated with corresponding maneuver(s) can be associated with lighter shade tiles. That is, at $T_2$, the tiles of the occupancy grid that correspond to a region of space that is most likely to be occupied by the other vehicle 104 (e.g., based on a detected intent that is associated with a highest confidence score) are darkest and the tiles of the occupancy grid that are less likely to be occupied by the other vehicle 104 (e.g., based on other detected intent(s) associated with confidence scores that meet or exceed a threshold) are a lighter shade. In additional or alternative examples, shading of tiles may be based at least in part on an overlap of intents (which may, in some examples, comprise all intents having at least some minimum associated probability). As a non-limiting example of such, a darker tile may comprise an indication for occupancy during both reversing and parking intents, whereas a lighter shade (or value) may be indicative of a reversing intent only. As such, the other vehicle 104 is most likely to occupy the portion of the environment 100 corresponding to the darkest tiles, which correspond to the parallel parking maneuver, but may be likely to occupy other portions of the environment 100 that are associated with other portions of the region 106.

In at least one example, the region 106 can be output for the duration of the maneuver. That is, the region 106 can be output for an entirety of time that the other vehicle 104 is determined to be associated with the intent that corresponds to the parallel parking maneuver. In some examples, the region 106 can be dynamically updated based on a position of the other vehicle 104 while the other vehicle 104 performs the maneuver. That is, as the position of the other vehicle 104 changes, the prediction component can update the region 106 associated with the other vehicle 104. In at least one example, updates to the region can be caused by determining that the intent of the other vehicle 104 has changed (e.g., as more sensor data is received and analyzed). In at least one example, such an update can cause the region 106 to change size, shape, or the like.

In at least one example, a planner component associated with the computing device(s) onboard the vehicle 102 can determine outputs to use to control the vehicle 102 based at least in part on sensor data received from the sensor component(s), map data, perception data, and/or any determinations made by the other components of the vehicle 102. In at least one example, the planner component can utilize the region 106 to determine a trajectory for controlling the vehicle 102. That is, the region 106 can be "blocked" such that the planner component understands that the vehicle 102 should not enter the region 106. As such, the planner component can determine a trajectory to prevent the vehicle 102 from entering the region 106. In some examples, the planner component can determine a trajectory and the computing device(s) onboard the vehicle 102 can determine one or more instructions based on the trajectory. When the one or more instructions are executed by the computing device(s) onboard the vehicle 102, such instruction(s) can cause the vehicle 102 to decelerate thereby increasing a follow distance between the vehicle 102 and the other vehicle 104, cause the vehicle 102 to yield to the other vehicle 104 and/or stop, cause the vehicle 102 to perform a lane change maneuver, cause the vehicle 102 to safely maneuver around the other vehicle 104, and/or cause the vehicle 102 to perform any other combination of maneuvers the vehicle 102 is capable of performing.

As illustrated at the third instance of time ($T_3$), the other vehicle 104 has completed the maneuver. That is, the other vehicle 104 is in a position that corresponds to a completed maneuver (parked in the previously vacant parking spot among the plurality of vehicles 108). In an alternative example—for instance, with another maneuver—a maneuver can be determined to be complete based at least in part on determining that the other vehicle 104 has stopped or that the other vehicle 104 is associated with a velocity that meets or exceeds a threshold. Because the other vehicle 104 is in a position that corresponds to a completed maneuver, the maneuver intent may no longer be associated with the other vehicle 104 and, accordingly, the region 106 is no longer associated with the other vehicle 104. That is, the region 106 may no longer be output and/or used as a signal for determining how to control the vehicle 102.

Figure 2:
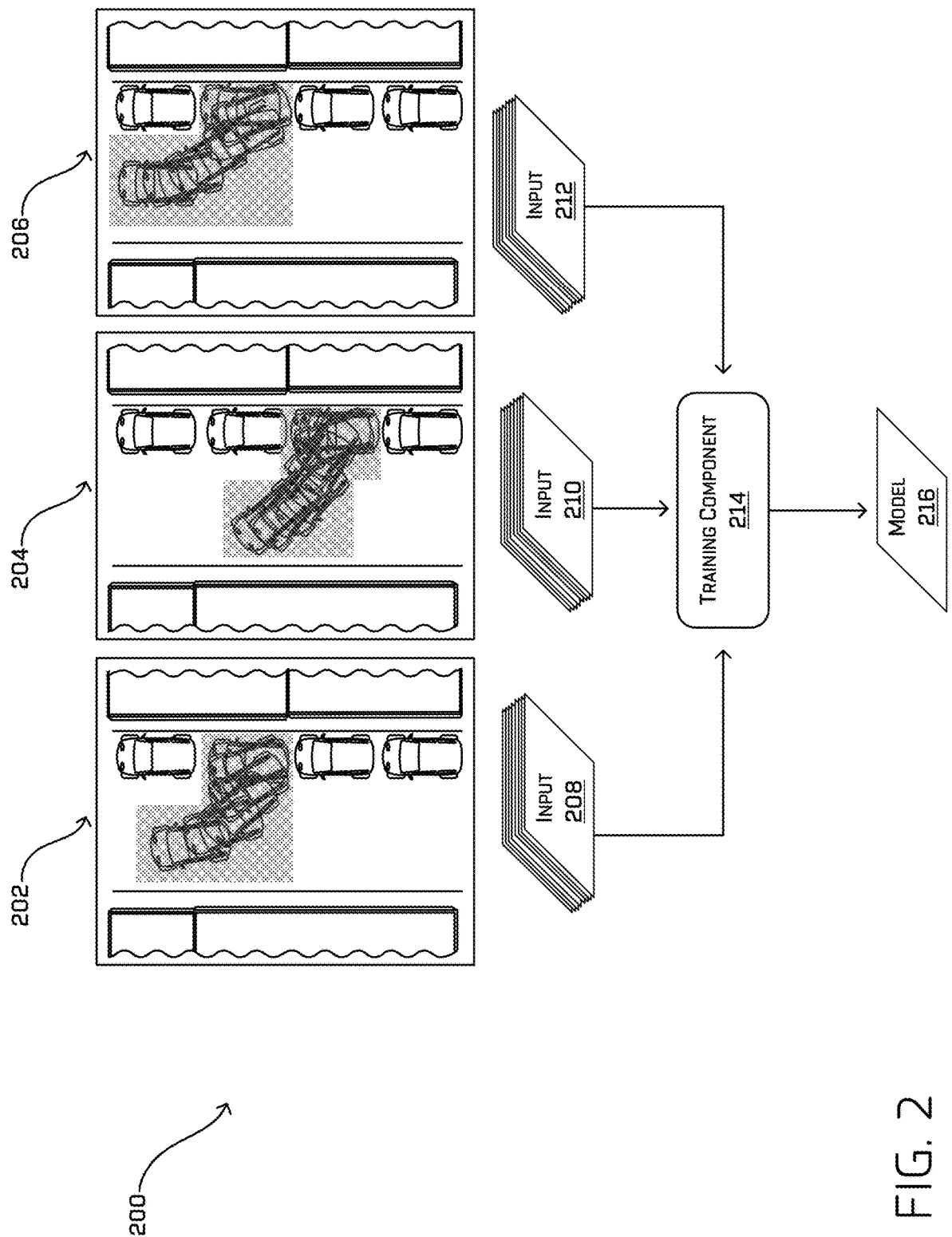
FIG. 2 illustrates an example environment for training a model for predicting a region to be occupied by a vehicle while performing a maneuver, as described herein.

FIG. 2 illustrates an example environment 200 for training a model for predicting a region to be occupied by a vehicle while performing a maneuver, as described herein. The environment 200 depicts three different events (e.g., event 202, event 204, and event 206) associated with a parallel parking maneuver. In practice however, any number of events can be used for input and each event need not be associated with the same maneuver.

In at least one example, a plurality of vehicles (e.g., a fleet of vehicles) can send sensor data to computing device(s) configured for training model(s). Additional details associated with such computing device(s) are described below with reference to FIG. 3. In some examples, such sensor data can be associated with driving logs (i.e., "log data"), which can indicate how individual vehicles of the plurality of vehicles moved within respective environments over time. That is, such driving logs can be historical driving logs indicating the movement of individual vehicles of the plurality of vehicles over time. In some examples, such driving logs can comprise sensor data—which can include output(s) of individual sensor(s) at a particular instance of t—me-that is received over time. In some examples, such driving logs can comprise outputs based on the sensor data (e.g., processed sensor data) associated with a period of time. That is, in some examples, log data can include raw sensor data received from the sensor component(s), as well as one or more downstream outputs (e.g., perception outputs, prediction outputs, planner outputs, control outputs, and the like) for individual messages during a drive mission of a vehicle, such as the vehicle 102.

In at least one example, each of the events depicted in FIG. 2 (e.g., event 202, event 204, and event 206) can be associated with log data indicating movement of the vehicle depicted in each event over time. In some examples, an annotation component associated with the computing device(s) configured for training model(s) can analyze the log data to detect events associated with, for example, parallel parking maneuvers. Then, the annotation component can determine a region that is occupied by a vehicle performing such a maneuver while the vehicle is performing the maneuver (e.g., for the duration of the maneuver). In at least one example, the annotation component can utilize heuristics to determine when events start and/or stop. For example, the annotation component can determine when a parallel parking maneuver is complete (e.g., the vehicle is stopped (e.g., has no instantaneous velocity) and/or is positioned in the parallel parking spot) and can backout (in time) in the log data to determine when the parallel parking maneuver started. The start of the event can be detected based on heuristics, such as the vehicle decelerating to a stop, the vehicle initiating a reversing maneuver, and/or a blinker or reverse light being activated. In at least one example, the annotation component can determine when a maneuver started and can advance forward (in time) in the log data to determine when the maneuver ended (e.g., the maneuver is complete). That is, the annotation component can move backward and/or forward in the log data to determine a start and end associated with an event. Then, the annotation component can determine the region that is occupied by the vehicle while the vehicle performs the parallel parking maneuver (e.g., from when the maneuver started to when the maneuver ended). In at least one example, the annotation component can annotate the log data to indicate the occurrence of the event (e.g., the parallel parking maneuver) and the start and end times associated with the event.

In some examples, the annotation component can leverage a model—trained via machine-learning mechanisms to detect intets—to detect intents in the log data. That is, in at least one example, the annotation component can automatically label events associated with such intents in the log data.

In at least one example, a training data generation component associated with the computing device(s) configured for training model(s) can generate training data. That is, in at least one example, the training data generation component can convert log data associated with an event into a multi-channel image, as described above. As described above, the multi-channel image can comprise multiple channels that each represent a different input, which can be map data, sensor data, data based on sensor data and/or map data (e.g., perception data, planner data, features, etc.), etc. In at least one example, the training data generation component can generate multi-channel images for instances of time during the parallel parking maneuver (e.g., start, start plus one second, start plus two seconds, and so on). As such, for each event (e.g., event 202, event 204, and event 206), a plurality of multi-channel images associated with each event can be provided as input into a training component 214 associated with the computing device(s) configured for training model(s). For example, input 208 can comprise a plurality of multi-channel images associated with the event 202, input 210 can comprise a plurality of multi-channel images associated with the event 204, and input 212 can comprise a plurality of multi-channel images associated with the event 206. Each of the multi-channel images can represent an instance of time within the period of time associated with a maneuver, and the aggregated plurality of multi-channel images can collectively represent the motion of a vehicle for an entirety of the corresponding maneuver. The region associated with the maneuver can be determined from the aggregated plurality of multi-channel images. As above, multiple multi-channel images representing a period of time preceding a most recent time step (or any other data structure) are contemplated.

In at least one example, the input 208, 210, and 212 can be provided to the training component 214 to train a model 216. In at least one example, the model 216 can be a multi-layer model, a convolutional neural network, a recurrent neural network, or the like. The model 216 can be trained to output an indication of a region that a vehicle is likely to occupy while performing a corresponding maneuver. In the example of FIG. 2, the model 216 can be trained to output an indication of a region that a vehicle is likely to occupy while performing a parallel parking maneuver. In some examples, the output can be an occupancy grid comprising individual tiles that are associated with confidence scores of whether respective portions of the environment are likely to be occupied by a vehicle while the vehicle performs a parallel parking maneuver. In some examples, the occupancy grid can be associated with different colors, tints, shades, or other indications to graphically represent different confidence scores.

In at least one example, the training component 214 can compare the output to an expected output associated with the training data and can modify one or more parameters of the model 216 based at least in part on a difference between the output and the expected output. An expected output may comprise a binary grid in which all grid positions occupied by an object performing a maneuver based on an intent between the start and stop times are set to a first value (e.g., 1) and other grid positions are set to a second value (e.g., 0). As such, the grid would be indicative of all positions which are occupied during the entirety of performing the maneuver. In such an example, one or more multi-channel images determined based at least in part on data between the start and stop time of the maneuver may be input into the network and differences between an output and the expected output may be used to modify one or more parameters of the network (e.g., using backpropagation) until a stopping parameter is achieved or has otherwise converged. In an example, the training component 214 can determine whether the model 216 satisfies a stopping parameter and/or otherwise has converged. If the model 216 has not satisfied a stopping parameter and/or otherwise converged, the training component 214 can modify one or more parameters of the model 216 (e.g., via gradient descent, back-propagation, and the like). The model 216 can be provided to a vehicle, such as the vehicle 102 in FIG. 1, for predicting regions that are likely to be occupied by vehicles while performing parallel parking maneuvers.

In at least one example, the training component 214 can train different models for different maneuvers, using techniques described above with reference to FIG. 2. As a result, multiple models can be provided to vehicles, such as the vehicle 102, for use onboard the vehicles. In some examples, the computing device(s) configured for training model(s) can train a single model, which can include one or more layers or one or more heads, associated with one or more maneuvers. That is, in some examples, a model need not be trained on a single maneuver but can be trained based on training data associated with multiple maneuvers. In such examples, a single model can be provided to vehicles, such as the vehicle 102, for use onboard the vehicles.

While FIGS. 1 and 2 illustrate examples associated with a parallel parking maneuver, as described above, techniques described herein can be applicable to any action and/or complex maneuver such as three-point turn maneuvers, perpendicular cut-in maneuvers (e.g., as described in U.S. patent application Ser. Nos. 16/803,644 and 16/803,705, filed on Feb. 27, 2020, the entire contents of both of which are incorporated by reference herein), and the like, whereby the timing of when a vehicle is going to be in a particular position may be insufficient for adequately predicting the behavior of the vehicle and determining how to safely maneuver an autonomous vehicle relative thereto.

Furthermore, while FIGS. 1 and 2 are directed to region blocking based on intents of vehicles, techniques described herein can be directed to region blocking based on intents of any other object, such as a bicycle or a pedestrian.

Figure 3:
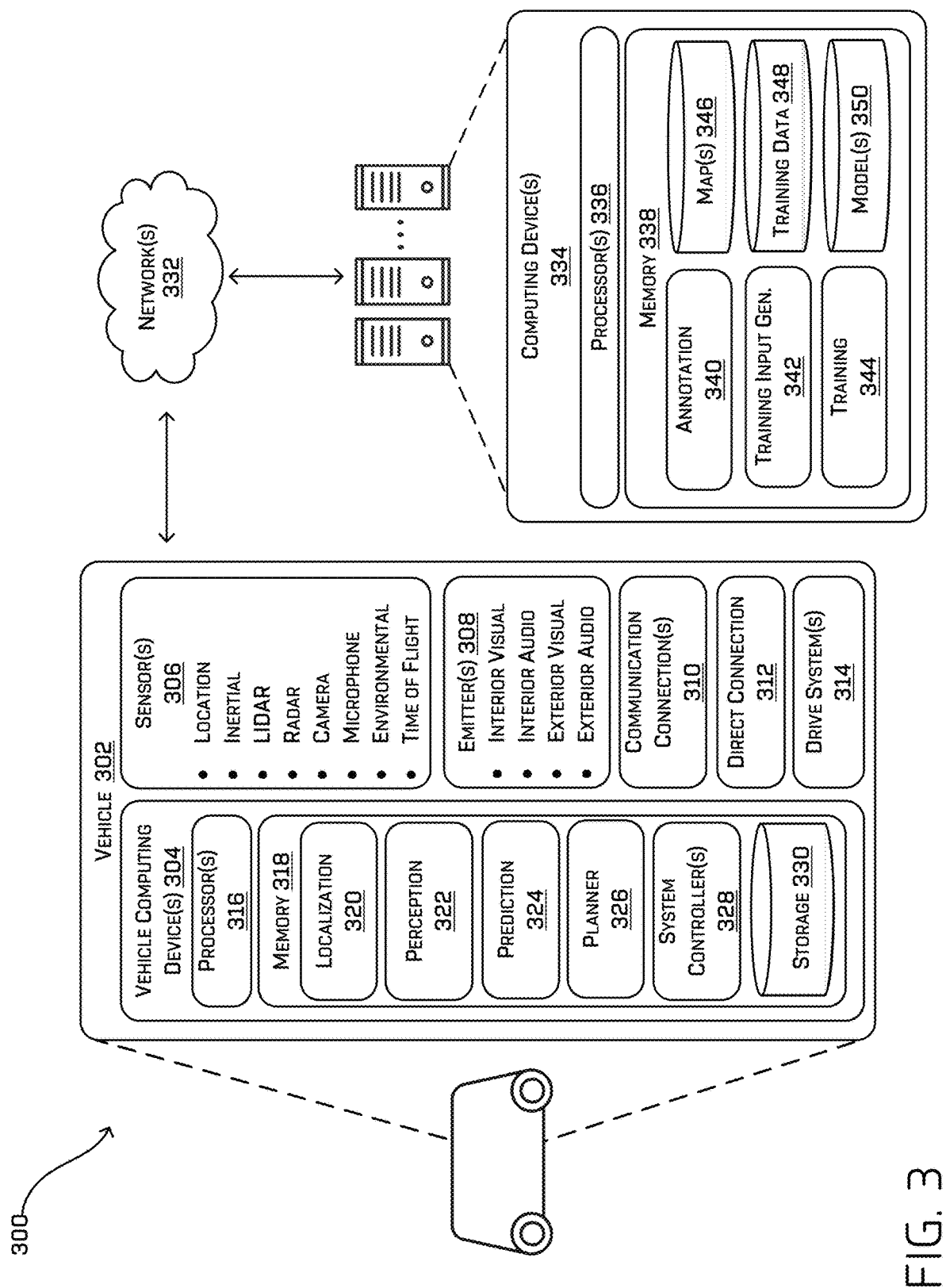
FIG. 3 is a block diagram illustrating an example system for performing techniques, as described herein.

FIG. 3 is a block diagram illustrating an example system 300 for performing techniques, as described herein. In at least one example, a vehicle 302 can include one or more vehicle computing devices 304, one or more sensor components 306, one or more emitters 308, one or more communication connections 310, at least one direct connection 312, and one or more drive systems 314. In at least one example, a vehicle 302 can correspond to the vehicle 102 described above with reference to FIG. 1. As described above with reference to FIG. 1, in the illustrated example, the vehicle 302 is an autonomous vehicle; however, the vehicle 302 could be any other type of vehicle. While only a single vehicle 302 is illustrated in FIG. 3, in a practical application, the example system 300 can include a plurality of vehicles, which, in some examples, can comprise a fleet of vehicles.

The vehicle computing device(s) 304 can include processor(s) 316 and memory 318 communicatively coupled with the processor(s) 316. In the illustrated example, the memory 318 of the vehicle computing device(s) 304 stores a localization component 320, a perception component 322, a prediction component 324, a planner component 326, and one or more system controllers 328. Additionally, the memory 318 can include a storage 330, which can store map(s), model(s), previous outputs, etc. A map can be any number of data structures that are capable of providing information about an environment, such as, but not limited to, topologies (such as junctions, lanes, merging zones, etc.), streets, mountain ranges, roads, terrain, and the environment in general. Maps can be associated with real environments or simulated environments. Model(s) can include machine-trained models, as described below. In some examples, the storage 330 can store previous outputs.

Functions that can be performed by the localization component 320, perception component 322, prediction component 324, and planner component 326 are described, at least in part, above with reference to FIG. 1. In at least one example, the localization component 320 can determine a pose (position and orientation) of the vehicle 302 in relation to a local and/or global map based at least in part on sensor data received from the sensor component(s) 306 and/or map data associated with a map (e.g., of the map(s)). In at least one example, the localization component 320 can include, or be associated with, a calibration component that is capable of performing operations for calibrating (determining various intrinsic and extrinsic parameters associated with any one or more of the sensor component(s) 306), localizing, and mapping substantially simultaneously.

In at least one example, the perception component 322 can perform object detection, segmentation, and/or classification based at least in part on sensor data received from the sensor component(s) 306. In at least one example, the perception component 322 can receive raw sensor data (e.g., from the sensor component(s) 306). In at least one example, the perception component 322 can receive sensor data and can utilize one or more processing algorithms to perform object detection, segmentation, and/or classification with respect to object(s) identified in the sensor data. In some examples, the perception component 322 can associate a bounding region (or otherwise an instance segmentation) with an identified object and can associate a confidence score associated with a classification of the identified object with the identified object. In some examples, objects, when rendered via a display, can be colored based on their perceived class.

The prediction component 324 can receive sensor data from the sensor component(s) 306, map data associated with a map (e.g., of the map(s) which can be in storage 330), and/or perception data output from the perception component 322 (e.g., processed sensor data), and can output predictions associated with one or more objects within the environment of the vehicle 302. In at least one example, the planner component 326 can determine outputs, to use to control the vehicle 302 based at least in part on sensor data received from the sensor component(s) 306, map data, and/or any determinations made by the other components of the vehicle 302.

Additional details of localization components, perception components, prediction components, and/or planner components that are usable can be found in U.S. Pat. No. 9,612,123, issued on Apr. 4, 2017, and U.S. Pat. No. 10,353,390, issued on Jul. 16, 2019, the entire contents of both of which are incorporated by reference herein. In some examples (e.g., where the vehicle 302 is not an autonomous vehicle), one or more of the aforementioned components can be omitted from the vehicle 302. While the components described above are illustrated as "onboard" the vehicle 302, in other implementations, the components can be remotely located and/or accessible to the vehicle 302. Furthermore, while the components are described above as "components," such components can comprise one or more components, which can be part of a system, for performing operations attributed to each of the components.

In at least one example, the localization component 320, the perception component 322, the prediction component 324, and/or the planner component 326 can process sensor data, as described above, and can send their respective outputs over network(s) 332, to computing device(s) 334. In at least one example, the localization component 320, the perception component 322, the prediction component 324, and/or the planner component 326 can send their respective outputs to the computing device(s) 334 at a particular frequency, after a lapse of a predetermined period of time, in near real-time, etc.

In at least one example, the vehicle computing device(s) 304 can include one or more system controllers 328, which can be configured to control steering, propulsion, braking, safety, emitters, communication, and other systems of the vehicle 302. These system controller(s) 328 can communicate with and/or control corresponding systems of the drive system(s) 314 and/or other systems of the vehicle 302.

In at least one example, the sensor component(s) 306 can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), ToF sensors, etc. The sensor component(s) 306 can provide input to the vehicle computing device(s) 304. In some examples, the sensor component(s) 306 can preprocess at least some of the sensor data prior to sending the sensor data to the vehicle computing device(s) 304. In at least one example, the sensor component(s) 306 can send sensor data, via the network(s) 332, to the computing device(s) 334 at a particular frequency, after a lapse of a predetermined period of time, in near real-time, etc.

The vehicle 302 can also include one or more emitters 308 for emitting light and/or sound, as described above. The emitter(s) 308 in this example include interior audio and visual emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 308 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 308 can be positioned at various locations about the exterior and/or interior of the vehicle 302.

The vehicle 302 can also include communication connection(s) 310 that enable communication between the vehicle 302 and other local or remote computing device(s). For instance, the communication connection(s) 310 can facilitate communication with other local computing device(s) on the vehicle 302 and/or the drive system(s) 314. Also, the communication connection(s) 310 can allow the vehicle to communicate with other nearby computing device(s) (e.g., other nearby vehicles, traffic signals, etc.). The communications connection(s) 310 also enable the vehicle 302 to communicate with a remote teleoperations computing device or other remote services.

The communications connection(s) 310 can include physical and/or logical interfaces for connecting the vehicle computing device(s) 304 to another computing device or a network, such as network(s) 332. For example, the communications connection(s) 310 can enable Wi-Fi-based communication such as via frequencies defined by the IEEE 802.11 standards, short range wireless frequencies such as BLUETOOTH®, or any suitable wired or wireless communications protocol that enables the respective computing device to interface with the other computing device(s).

The direct connection 312 can directly connect the drive system(s) 314 and other systems of the vehicle 302.

In at least one example, the vehicle 302 can include drive system(s) 314. In some examples, the vehicle 302 can have a single drive system 314. In at least one example, if the vehicle 302 has multiple drive systems 314, individual drive systems 314 can be positioned on opposite ends of the vehicle 302 (e.g., the front and the rear, etc.). In at least one example, the drive system(s) 314 can include sensor component(s) to detect conditions of the drive system(s) 314 and/or the surroundings of the vehicle 302. By way of example and not limitation, the sensor component(s) can include wheel encoder(s) (e.g., rotary encoders) to sense rotation of the wheels of the drive system, inertial sensors (e.g., inertial measurement units, accelerometers, gyroscopes, magnetometers, etc.) to measure position and acceleration of the drive system, cameras or other image sensors, ultrasonic sensors to acoustically detect objects in the surroundings of the drive system, lidar sensors, radar sensors, etc. Some sensors, such as the wheel encoder(s), can be unique to the drive system(s) 314. In some cases, the sensor component(s) on the drive system(s) 314 can overlap or supplement corresponding systems of the vehicle 302 (e.g., sensor component(s) 306).

The drive system(s) 314 can include many of the vehicle systems, including a high voltage battery, a motor to propel the vehicle 302, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 314 can include a drive system controller which can receive and preprocess data from the sensor component(s) and to control operation of the various vehicle systems. In some examples, the drive system controller can include processor(s) and memory communicatively coupled with the processor(s). The memory can store one or more components to perform various functionalities of the drive system(s) 314. Furthermore, the drive system(s) 314 also include communication connection(s) that enable communication by the respective drive system with other local or remote computing device(s).

In FIG. 3, the vehicle computing device(s) 304, sensor component(s) 306, emitter(s) 308, and the communication connection(s) 310 are shown onboard the vehicle 302. However, in some examples, the vehicle computing device(s) 304, sensor component(s) 306, emitter(s) 308, and the communication connection(s) 310 can be implemented outside of an actual vehicle (i.e., not onboard the vehicle 302).

As described above, the vehicle 302 can send sensor data to the computing device(s) 334, via the network(s) 332. In some examples, the vehicle 302 can send raw sensor data to the computing device(s) 334. In other examples, the vehicle 302 can send processed sensor data and/or representations of sensor data to the computing device(s) 334 (e.g., data output from the localization component 320, the perception component 322, the prediction component 324, and/or the planner component 326). In some examples, the vehicle 302 can send sensor data to the computing device(s) 334 at a particular frequency, after a lapse of a predetermined period of time, in near real-time, etc.

The computing device(s) 334 can receive the sensor data (raw or processed) from the vehicle 302 and/or other data collection devices, as well as data from one or more third party sources and/or systems. In at least one example, the computing device(s) 334 can include processor(s) 336 and memory 338 communicatively coupled with the processor(s) 336. In the illustrated example, the memory 338 of the computing device(s) 334 stores an annotation component 340, a training data generation component 342, a training component 344, a map(s) storage 346 (e.g., storing one or more maps), a training data storage 348 (e.g., storing training data accessible to the training component 344), and a model(s) storage 350 (e.g., models output by the training component 344). In some examples, one or more of the systems and/or storage repositories can be associated with the vehicle 302 or other computing device(s) associated with the system 300 instead of, or in addition to, being associated with the memory 338 of the computing device(s) 334.

Functions that can be performed by the annotation component 340, training data generation component 342, and training component 344 are described above, at least in part, with reference to FIG. 2 (e.g., with respect to the training component 214). In at least one example, the annotation component 340 can receive or otherwise determine annotated data based at least in part on sensor data and/or log data associated with the sensor data received from one or more vehicles, as described herein. The training data generation component 342 can generate training data, as described herein. As described above, such training data can comprise a multi-channel image that represents an environment from a top-down view. As above, while a multi-channel image is described, multiple multi-channel images representing a period of time preceding a most recent time step (or any other data structure) are contemplated. In at least one example, resulting training data can be stored in the training data storage 348, which can be accessible to the training component 344.

In at least one example, the training component 344 can train model(s) based at least in part on the training data, which can be used for various operations as described herein. That is, the training component 344 can train model(s) that can be used for predicting a region that is likely to be occupied by a vehicle while the vehicle is performing a particular maneuver. Additional details associated with training the model(s), as used herein, are described below with reference to FIG. 4. In at least one example, the resulting model(s) can be stored in the model(s) storage 350 and/or the storage 330 on the vehicle 302 and can be accessed in near real-time by one or more components of the vehicle computing device(s) 304.

The processor(s) 316 of the vehicle 302 and the processor(s) 336 of the computing device(s) 334 can be any suitable processor capable of executing instructions to process data and perform operations as described herein. By way of example and not limitation, the processor(s) 316 and 336 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 318 and 338 are examples of non-transitory computer-readable media. Memory 318 and 338 can store an operating system and one or more software applications, instructions, programs, and/or data to implement the methods described herein and the functions attributed to the various systems. In various implementations, the memory can be implemented using any suitable memory technology, such as static random receive memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 3 is illustrated as a distributed system, in some examples, components of the vehicle 302 can be associated with the computing device(s) 334 and/or the components of the computing device(s) 334 can be associated with the vehicle 302. That is, the vehicle 302 can perform one or more of the functions associated with the computing device(s) 334, and vice versa.

Furthermore, while the vehicle computing device(s) 304 and the computing device(s) 334 are shown to include multiple components, in some examples, such components can be associated with more or fewer individual components. For example, in an example, a localization component, a perception component, a prediction component, and/or a planner component can be combined into a single component. Or, an annotation component, a training data generation component, and/or a training component can be combined into a single component. That is, while depicted as separate components, any one or more of the components can be combined.

Figure 4:
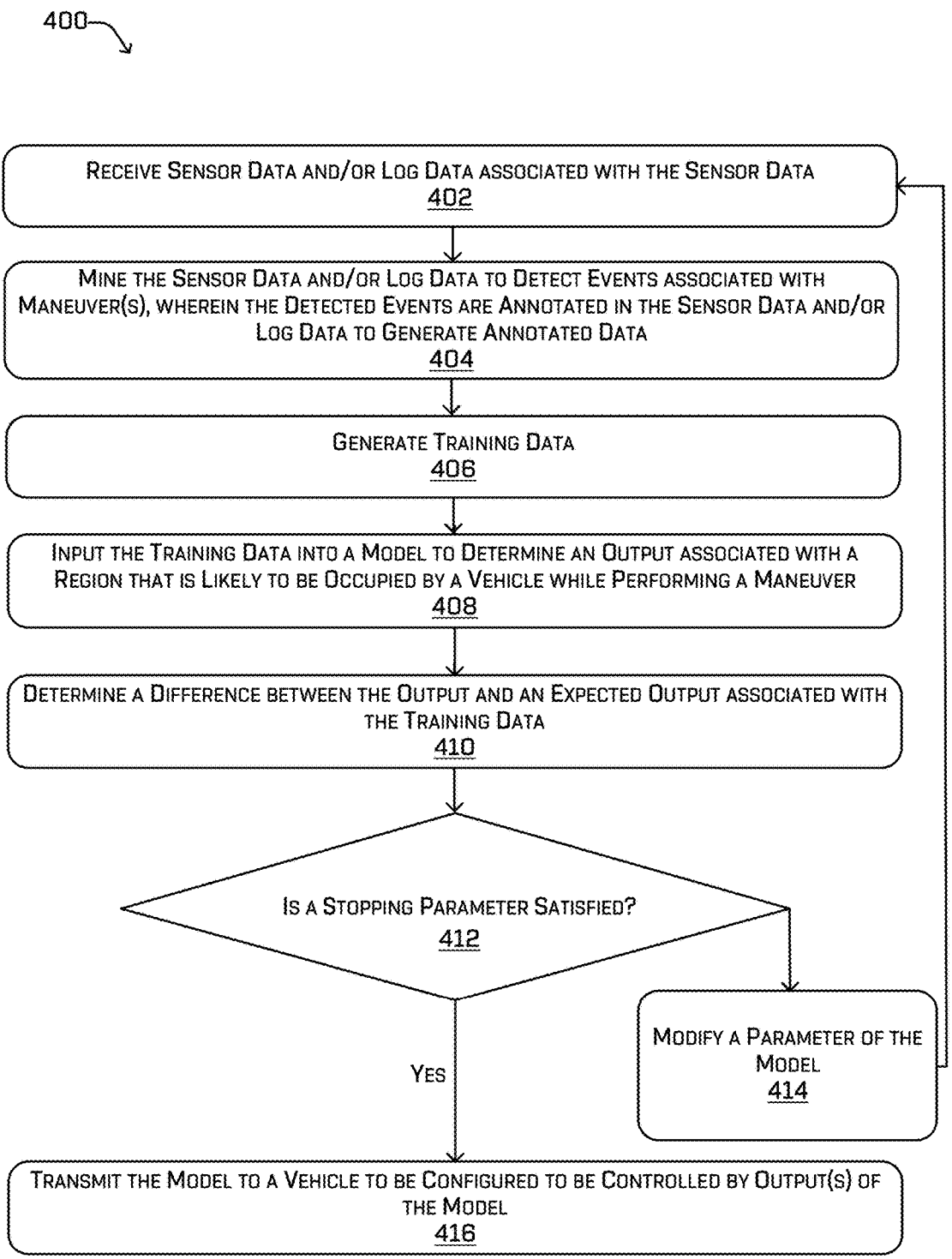
FIG. 4 illustrates an example process for training a model for predicting a region to be occupied by a vehicle while performing a maneuver, as described herein.
Figure 5:
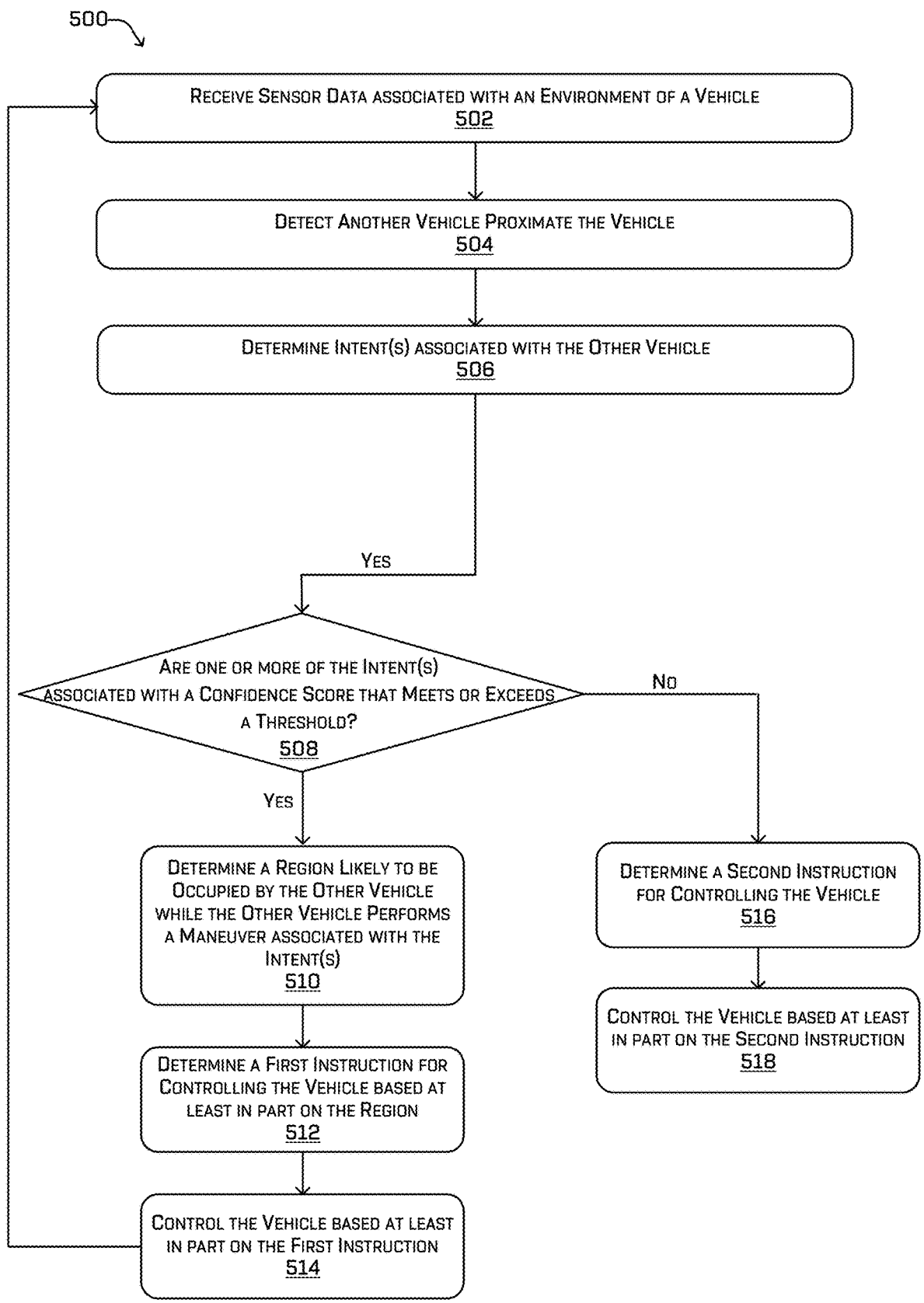
FIG. 5 illustrates an example process for predicting a region to be occupied by a vehicle while performing a maneuver, and controlling another vehicle based on such a prediction, as described herein.

FIGS. 4 and 5 are flowcharts showing example processes involving techniques as described herein. The processes illustrated in FIGS. 4 and 5 are described with reference to the system 300 shown in FIG. 3 for convenience and ease of understanding. However, the processes illustrated in FIGS. 4 and 5 are not limited to being performed using the system 300. Moreover, the system 300 described herein is not limited to performing the processes illustrated in FIGS. 4 and 5.

The processes 400 and 500 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes 400 and 500 can be combined in whole or in part with each other or with other processes.

FIG. 4 illustrates an example process 400 for training a model for predicting a region to be occupied by a vehicle while performing a maneuver, as described herein.

Block 402 illustrates receiving sensor data and/or log data associated with the sensor data. As described above, individual vehicles, such as the vehicle 302, can include sensor component(s) 306. In at least one example, a plurality of vehicles (e.g., a fleet of vehicles) can send sensor data, via the network(s) 332, to the computing device(s) 334. As described above, in some examples, such sensor data can be associated with driving logs (i.e., "log data"), which can indicate how individual vehicles of the plurality of vehicles moved within respective environments over time. That is, such driving logs can be historical driving logs indicating the movement of individual vehicles of the plurality of vehicles over time. In some examples, log data can include raw sensor data received from the sensor component(s) 306, as well as one or more downstream outputs (e.g., perception outputs, prediction outputs, planner outputs, control outputs, and the like) for individual messages during a drive mission of a vehicle, such as the vehicle 302. In at least one example, the computing device(s) 334 can receive sensor data and/or associated driving logs from the plurality of vehicles.

Block 404 illustrates mining the sensor data and/or the log data to detect events associated with maneuver(s) (e.g., any one or more of the maneuvers described in detail herein), wherein the detected events are annotated in the sensor data and/or log data to generate annotated data.

In some examples, the annotation component 340 can analyze the sensor data and/or log data to detect events associated with a maneuver (e.g., any one or more of the maneuvers described in detail herein). Then, for each detected event, the annotation component 340 can determine a region that is occupied by a vehicle performing a maneuver while the vehicle is performing the maneuver (e.g., for the duration of the maneuver). In at least one example, the annotation component 340 can determine when a maneuver is complete and can backout (in time) in the log data to determine when the maneuver started. In at least one example, the annotation component 340 can determine when a maneuver started and can advance forward (in time) in the log data to determine when the maneuver ended (e.g., the maneuver is complete). That is, the annotation component 340 can move backward and/or forward in the log data to determine a start and end associated with an event. As described above, determining when an event starts or ends can be based on heuristics applied to evaluating sequences in log data. Such heuristics can include position of a vehicle, instantaneous velocity of the vehicle, lighting states associated with the vehicle, etc. For instance, a start of a cut-in event may be detected based on a vehicle being positioned in a parking spot at a first time and, at a second, later time, being on a driving surface, driving at a non-zero velocity. As another example, a start of a parallel parking maneuver can be associated with an on-road vehicle decelerating and activation of reverse lights, proximate a parking spot. In at least some examples, the start and end times may be modified (e.g., extended) to ensure that the entirety of the maneuver is captured. The associated data between the start and end time may then, in turn, be used for training the one or more models described herein. Based on determining a period of time associated with an event, the annotation component 340 can determine the region that is occupied by the vehicle while the vehicle performs the parallel parking maneuver (e.g., from when the maneuver started to when the maneuver ended). In at least one example, the annotation component 340 can annotate the log data to indicate the occurrence of an event and the start and end associated with the event. Further, in some examples, an expected output may be determined based on the associated data between the start and end times as described in detail above (e.g., the binary grid, occupancy grid, etc.).

As described above, in some examples, the annotation component 340 can leverage model(s)—trained via machine-learning mechanisms to detect intents—to detect intents in the log data. That is, in at least one example, the annotation component 340 can automatically label events associated with such intents in the log data.

Block 406 illustrates generating training data. In at least one example, the training data generation component 342 can generate training data. That is, in at least one example, the training data generation component 342 can convert log data associated with an event into a multi-channel image, as described above. As described above, the multi-channel image can comprise multiple channels that each represent a different input, which can be map data, sensor data, data determined based at least in part on the map data and/or sensor data (e.g., perception data, planner data, a feature, etc.), etc. In at least one example, the training data generation component 342 can generate multi-channel images for instances of time during the maneuver (e.g., start, start plus one second, start plus two seconds, and so on). As such, for each event, a plurality of multi-channel images associated with each event can be provided as input into a training component 344 associated with the computing device(s) configured for training model(s). That is, as described above, while a single multi-channel image is described, multiple multi-channel images representing a period of time preceding a most recent time step (or any other data structure) are contemplated. For example, multiple multi-channel images, representing a period of time associated with a maneuver, can be aggregated as input for training model(s).

In some examples, the training data, and associated sensor data and/or log data, can be referred to as ground truth. That is, the ground truth can be generated from the log data. As described above, all regions occupied for an entirety of a maneuver performed by a vehicle, as determined from the log data, can be used as ground truth for training model(s) as described herein.

Block 408 illustrates inputting the training data into a model to determine an output associated with a region that a vehicle is likely to occupy while it performs a maneuver. In at least one example, the training data can be provided to the training component 344 to train a model. In at least one example, the model can be a multi-layer model, a convolutional neural network, a recurrent neural network, or the like. The model can be trained to output an indication of a region that a vehicle is likely to occupy while performing a corresponding maneuver. In some examples, the output can be an occupancy grid comprising individual tiles that are associated with confidence scores of whether respective portions of the environment are likely to be occupied by a vehicle while the vehicle performs a maneuver. In some examples, the occupancy grid can be associated with different colors, tints, shades, or other indications to graphically represent different confidence scores.

Block 410 illustrates determining a difference between the output data and an expected output based at least in part on the training data. In at least one example, the resulting model can determine an output associated with a region that is likely to be occupied by a vehicle while the vehicle performs a maneuver (e.g., to which the events described above correspond), as described herein. The training component 344 can compare the output with an expected output, based at least in part on the annotated data, to determine a difference. In at least one example, the training component 344 can modify one or more parameters of the model based at least in part on the difference (e.g., via gradient descent, back-propagation, and the like).

Block 412 illustrates determining whether a stopping parameter is satisfied. In at least one example, the training component 344 can determine whether a stopping parameter is satisfied. For instance, in at least one example, the training component 344 can determine whether the difference is greater than or equal to a threshold. That is, the stopping parameter can be associated with a threshold. In some examples, the stopping parameter can be associated with a number of iterations, after which the stopping parameter can be satisfied. In at least one example, the stopping parameter can be a change in error from iteration to iteration. That is, when the change in error between iterations satisfies a threshold, the stopping parameter can be determined to be satisfied. In some examples, the stopping parameter can be associated with convergence (e.g., is the absolute error less than or equal to some threshold, is the change from a previous output less than or equal to a threshold, etc.). Any other stopping parameter is within the scope of this disclosure.

If the stopping parameter is not yet satisfied, the training component 344 can modify a parameter of the model, as illustrated in block 414, and the process 400 can return to block 402. If the stopping parameter is satisfied, the training component 344 can transmit the model to the model(s) storage 350 and/or storage on a vehicle, such as the storage 330 on the vehicle 302. In some examples, and as illustrated in block 416, the model can be transmitted to a vehicle, such as the vehicle 302, that can be configured to be controlled by output(s) of the model. In such an example, the resulting model can be stored in the storage 330 on the vehicle 302 and can be accessed in near real-time by one or more components of the vehicle computing device(s) 304, as described below with reference to FIG. 5.

In at least one example, the training component 344 can train model(s) using machine learning techniques. Block 408 makes reference to one or more neural networks, such as a convolutional neural network, that can be used to train the model. Additional or alternative machine learning algorithms can be used for training the model. Such machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), example-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), other Deep Belief Networks (DBN), Artificial Neural Network (ANN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), SVM (support vector machine), supervised learning, unsupervised learning, semi-supervised learning, etc.

While FIG. 4 refers to training a single model, as described above, the single model can comprise multiple layers and/or multiple heads, which in some examples, can be associated with different intents. In other examples, the training component 344 can train multiple models. In examples where a single model is trained, different weights can be applied to different tiles in the occupancy grid based on different maneuvers. As a non-limiting example, tiles associated with a reversing maneuver may be upweighted as, despite having a low associated probability, more space should be afforded for the multiple objects to perform their relative maneuvers if possible (e.g., at least above some threshold). As noted above, such single models may additionally, or alternatively, comprise multiple heads. In such case, each head may output a separate occupancy grid associated with a particular maneuver. In those examples in which multiple output grids are determined (e.g., in the case of multiple models or a single model with multiple heads), a final resultant output grid may be determined based at least in part on a weighted sum (that, in some examples, may be normalized). Furthermore, in at least one example, a loss function can be leveraged by the training component 344 in training the model(s).

FIG. 5 illustrates an example process 500 for predicting a region to be occupied by a vehicle while performing a maneuver, and controlling another vehicle based on such a prediction, as described herein.

Block 502 illustrates receiving sensor data associated with an environment of a vehicle. As described above, the vehicle 302 can be associated with one or more sensor components 306. The sensor component(s) 306 can provide sensor data to one or more components of the vehicle computing device(s) 304.

Block 504 illustrates detecting another vehicle proximate the vehicle. In at least one example, as described above, the perception component 322 can perform object detection, segmentation, and/or classification based at least in part on sensor data received from sensor component(s) 306 of the vehicle 302. In at least one example, the perception component 322 can detect another vehicle proximate the vehicle 302. That is, the perception component 322 can detect the other vehicle is within a threshold distance of the vehicle 302 (e.g., such that the vehicle may influence the motion of the vehicle) 302.

Block 506 illustrates determining intent(s) associated with the other vehicle. In at least one example, the prediction component 324, which can receive sensor data from the sensor component(s) 306, map data associated with a map (e.g., of the environment within which the vehicle 302 is positioned), and/or perception data output from the perception component 322 (e.g., processed sensor data), can output predictions associated with one or more objects within the environment of the vehicle 302. As described above, in at least one example, the prediction component 324 can receive the sensor data, map data, and/or perception data as individual channels of a multi-channel image that represents a top-down representation of the environment. In at least one example, the channel(s) can be input into a model, such as a multi-layer model, a convolutional neural network, a recurrent neural network, or the like, to predict an intent of the other vehicle, as described above. In at least one example, the model can output one or more intents and each intent can be associated with a confidence score indicating a confidence that a particular intent is associated with the other vehicle.

Block 508 illustrates determining whether one or more of the intent(s) are associated with a confidence score that meets or exceeds a threshold. As described above, each intent can be associated with a confidence score. In at least one example, the prediction component 324 can compare each confidence score with a threshold to determine whether the confidence score meets or exceeds the threshold. For intents with confidence scores that meet or exceed the threshold, the process 500 can proceed to block 510.

Block 510 illustrates determining a region likely to be occupied by the other vehicle while the other vehicle performs a maneuver associated with the intent(s). As described above, in some examples, the prediction component 324 can leverage model(s), trained by machine learning mechanism(s) as described above with reference to FIG. 4, to output an indication of a region of space that is likely to be occupied by the other vehicle while the other vehicle performs a maneuver associated with an intent (e.g., for an entirety of time associated with the maneuver and/or while the other vehicle is associated with the intent). In at least one example, the indication can comprise an occupancy grid comprising individual tiles that are associated with probabilities of whether respective portions of the environment are likely to be occupied by another vehicle while the other vehicle performs the maneuver. In some examples, the occupancy grid can be associated with different colors, tints, shades, or other indications to graphically represent different probabilities. In some examples, the occupancy grid can be centered on the other vehicle, which may or may not align with the map of the environment.

In some examples, the prediction component 324 can determine regions for each detected intent and the region output by the prediction component 324 can be determined based on each of the regions. In some examples, the prediction component 324 can determine regions for some detected intents, but not all detected intents. For example, in at least one example, the prediction component 324 can determine a region conditional on a type of intent. That is, if spatial prediction is preferred for a particular intent, the prediction component 324 can determine a region while the other vehicle is associated with such an intent. In some examples, the prediction component 324 can determine region(s) for each intent associated with a confidence score that meets or exceeds a threshold. In examples where more than one region is determined for more than one intent, the region output by the prediction component 324 can be based on one or more regions associated with one or more intents. In such examples, tiles associated with regions corresponding to intents with highest confidence scores can be darker than tiles associated with regions corresponding to intents with lower confidence scores (that meet or exceed the threshold).

In some examples, a single model can be used to determine a region for an intent (e.g., that is associated with a confidence score that meets or exceeds the threshold). In some examples, the model can be selected based on the intent. In some examples, a model can be used to determine a region for more than one intent (e.g., each that are associated with a confidence score that meets or exceeds the threshold). In such examples, such a model can be a multi-layer model and/or a model associated with multiple heads. In at least one example, multiple models can be used.

Block 512 illustrates determining a first instruction for controlling the vehicle based at least in part on the region. In at least one example, the planner component can determine outputs to use to control the vehicle 302 based at least in part on sensor data received from the sensor component(s) 306, map data, perception data, and/or any determinations made by the other components of the vehicle. In at least one example, the planner component 326 can utilize the region to determine a trajectory for controlling the vehicle 302. That is, the region can be "blocked" such that the planner component 326 understands that the vehicle 302 should not enter the region. As such, the planner component 326 can determine a trajectory to prevent the vehicle 302 from entering the region. The vehicle computing device(s) 304 can then generate one or more instructions for controlling the vehicle and can control the vehicle 302 based on the one or more instructions, as illustrated in block 514. In some examples, the planner component 326 can determine a trajectory, wherein the instructions associated therewith cause the vehicle 302 to decelerate thereby increasing a follow distance between the vehicle 302 and the other vehicle, cause the vehicle 302 to yield to the other vehicle and/or stop, cause the vehicle 302 to perform a lane change maneuver, cause the vehicle 302 to safely maneuver around the other vehicle, and/or cause the vehicle 302 to perform any other combination of maneuvers the vehicle 302 is capable of performing. Furthermore, in some examples, detection of such a region can prompt the vehicle 302 to call or otherwise reach out to a remote operator for assistance.

For examples where determined intent(s) are not associated with confidence score(s) that meet or exceed the threshold (e.g., such confidence score(s) do not meet the threshold), the process can proceed to block 516 and the planner component 326 can determine a trajectory without regard to any region blocking. The vehicle computing device(s) 304 can then generate one or more instructions for controlling the vehicle 302. That is, in at least one example, the planner component 326 can determine a second instruction for controlling the vehicle 302 based at least in part on the trajectory, as illustrated in block 516. The vehicle computing device(s) 304 can control the vehicle 302 based on the second instruction, as illustrated in block 518.

As described above, in at least one example, the region can be output for the duration of the maneuver. That is, the region can be output while the other vehicle is determined to be associated with the intent. In some examples, the region can be dynamically updated based on a position of the other vehicle while the other vehicle performs the maneuver. That is, as the position of the other vehicle changes, the prediction component can update the region associated with the other vehicle. In at least one example, such an update can cause the region to change size, shape, or the like. As an example, the prediction component 324 can receive updated sensor data and determine whether the vehicle is still associated with the same intent(s). If the intent(s) of the vehicle have changed and/or confidence score(s) associated with such intent(s) have changed, the prediction component 324 can determine an updated region associated with the other vehicle. In some examples, such an updated region can have a different shape or size than the previous region, which can be based at least in part on the updated sensor data and the intent(s) and/or tiles can be associated with different shading.

As described above, techniques described herein can be useful for prediction problems associated with intents and associated maneuvers that are complex and longer-term such that time-based prediction may inadequate. Such complex maneuvers can include, but are not limited to, parallel parking maneuvers, three-point turn maneuvers, perpendicular cut-in maneuvers (e.g., which can include u-turns, k-turns, n-point turns, reversing maneuvers, etc.). As described above, by training one or more models to predict regions of space likely to be occupied by vehicles (or other objects) performing longer-term, complex maneuvers, techniques described herein offer improvements to existing prediction techniques, thereby improving prediction accuracy and safety in environments associated with autonomous vehicles.

Example Clauses

A. A method comprising: receiving sensor data associated with an environment of a first vehicle; determining, based at least in part on the sensor data, an intent of a second vehicle proximate the first vehicle, wherein the intent is associated with a maneuver; determining, based at least in part on the sensor data and the intent, a region around the second vehicle that is likely to be occupied by the second vehicle for an entirety of time that the second vehicle is associated with the intent; and determining an instruction for controlling the first vehicle based at least in part on the region.

B. The method as paragraph A recites, further comprising: generating, based at least in part on the sensor data, a multi-channel image comprising a top-down representation of the environment, a channel of the multi-channel image being associated with a feature of the second vehicle or the environment; and determining the region around the second vehicle based at least in part on analyzing the multi-channel image using a convolutional neural network.

C. The method as paragraph A or B recites, wherein the maneuver comprises at least one of a parallel parking maneuver, a reversing maneuver, or a perpendicular cut-in maneuver.

D. The method as any of paragraphs A-C recites, wherein the instruction for controlling the first vehicle comprises an instruction to cause the first vehicle to at least one of: decelerate; stop; perform a lane change; or send a signal to a remote operator.

E. The method as any of paragraphs A-D recites, wherein determining the region around the second vehicle is performed at a first time, the method further comprising: receiving, at a second time, updated sensor data; determining, based at least in part on the updated sensor data, an updated region around the second vehicle that is to be occupied by the second vehicle; and determining an updated instruction for controlling the first vehicle based at least in part on the updated region.

F. A system comprising: one or more processors; and one or more non-transitory computer-readable media storing instructions, that when executed by the one or more processors, cause the system to perform operations comprising: receiving sensor data associated with an environment of a vehicle; receiving, based at least in part on the sensor data, a region associated with an object proximate the vehicle that is to be occupied by the object for an entirety of time that the object performs an action; and determining an instruction for controlling the vehicle based at least in part on the region.

G. The system as paragraph F recites, the operations further comprising:
determining, based at least in part on the sensor data, a confidence score associated with an intent of the object; and determining that the confidence score meets or exceeds a threshold, wherein the region is determined based at least in part on the intent, and wherein the action is associated with the intent.

H. The system as paragraph F or G recites, the operations further comprising:
determining, based at least in part on the sensor data, a plurality of intents of the object, wherein a first intent of the plurality of intents is associated with a first confidence score and a second intent of the plurality of intents is associated with a second confidence score; determining that the first confidence score and the second confidence score meet or exceed a threshold; determining a first region associated with the object that is to be occupied by the object while the object performs a first action associated with the first intent; and determining a second region associated with the object that is to be occupied by the object while the object performs a second action associated with the second intent, wherein the region is determined based on at least one of the first region or the second region.

I. The system as any of paragraphs F-H recites, the operations further comprising: generating, based at least in part on the sensor data, an input comprising a top-down representation of the environment, wherein the top-down representation comprises a multi-channel image; inputting the input into a convolutional neural network; and receiving the region associated with the object from the convolutional neural network.

J. The system as paragraph I recites, the operations further comprising selecting the convolutional neural network based at least in part on the action.

K. The system as any of paragraphs F-J recites, the operations further comprising determining an occupancy grid, wherein a tile associated with the occupancy grid is associated with a confidence score indicative of whether a portion of the environment is likely to be occupied by the object, and wherein the region is defined based at least in part on the occupancy grid.

L. The system as paragraph K recites, the operations further comprising inputting the occupancy grid into a planner component associated with the vehicle to determine the instruction for controlling the vehicle.

M. The system as any of paragraphs F-L recites, wherein the vehicle is an autonomous vehicle and wherein the instruction for controlling the vehicle comprises an instruction to cause the vehicle to at least one of: decelerate; stop; perform a lane change; or send a signal to a remote operator.

N. The system as any of paragraphs F-M recites, wherein determining the region associated with the object is performed at a first time, the operations further comprising: receiving, at a second time, updated sensor data; determining, based at least in part on the updated sensor data and an associated intent, an updated region associated with the object that is to be occupied by the object; and determining an updated instruction for controlling the vehicle based at least in part on the updated region.

O. One or more non-transitory computer-readable media storing instructions, that when executed by one or more processors, cause the one or more processors to perform operations comprising: receiving sensor data associated with an environment of a vehicle; receiving, based at least in part on the sensor data, a region associated with an object proximate the vehicle that is to be occupied by the object for an entirety of time that the object performs an action; and determining an instruction for controlling the vehicle based at least in part on the region.

P. The one or more non-transitory computer-readable media as paragraph O recites, the operations further comprising: generating, based at least in part on the sensor data, an input comprising a top-down representation of the environment, wherein the top-down representation comprises a multi-channel image; inputting the input into a convolutional neural network, wherein the convolutional neural network is selected based at least in part on the action; and receiving the region associated with the object from the convolutional neural network.

Q. The one or more non-transitory computer-readable media as paragraph P recites, wherein the convolutional neural network is trained based at least in part on: receiving log data; detecting, based at least in part on the log data, another object that performs the action; determining a start time associated with the action and a stop time associated with the action; determining another region occupied by the other object during a period of time between the start time and the stop time; and training the convolutional neural network based at least in part on the other region.

R. The one or more non-transitory computer-readable media as any of paragraphs O-Q recites, wherein the region is determined based at least in part on the action and at least one other action, and wherein each action is associated with an intent that is associated with a confidence score that meets or exceeds a threshold.

S. The one or more non-transitory computer-readable media as any of paragraphs O-R recites, the operations further comprising determining an occupancy grid, wherein a tile associated with the occupancy grid is associated with a confidence score indicative of whether a portion of the environment is likely to be occupied by the object, and wherein the region is defined based at least in part on the occupancy grid.

T. The one or more non-transitory computer-readable media as paragraph R recites, the operations further comprising inputting the occupancy grid into a planner component associated with the vehicle to determine the instruction for controlling the vehicle, wherein the instruction for controlling the vehicle comprises an instruction to cause the vehicle to at least one of: decelerate; stop; perform a lane change; or send a signal to a remote operator.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
receiving sensor data associated with an environment of a first vehicle;
determining, based at least in part on the sensor data, a type of intent of a second vehicle proximate the first vehicle, wherein the intent is associated with a maneuver to be performed by the second vehicle during a future time, the maneuver comprising a plurality of trajectories within a first region in the environment;

determining, based at least in part on the intent, an entirety of time that the second vehicle performs the maneuver;

determining that the type of intent satisfies a temporal condition;

determining, based at least in part on the sensor data and the type of intent satisfying the temporal condition, a second region of the environment around and encompassing the second vehicle, wherein the second region includes areas in the environment that are likely to be occupied by the second vehicle for the entirety of time and within the first region;

determining, based at least in part on the sensor data and the second region of the environment, a blocked region corresponding to the first region that the first vehicle should not enter; and determining an instruction for controlling the first vehicle based at least in part on the blocked region.

2. The method as claim 1 recites, further comprising:

generating, based at least in part on the sensor data, a multi-channel image comprising a top-down representation of the environment, a channel of the multi-channel image being associated with a feature of the second vehicle or the environment; and determining the second region of the environment around the second vehicle based at least in part on analyzing the multi-channel image using a convolutional neural network.

3. The method as claim 1 recites, wherein the instruction for controlling the first vehicle comprises an instruction to cause the first vehicle to at least one of:

decelerate;

stop;

perform a lane change; or send a signal to a remote operator.

4. The method as claim 1 recites, wherein determining the second region of the environment around the second vehicle is performed at a first time, the method further comprising:

receiving, at a second time, updated sensor data;

determining, based at least in part on the updated sensor data, an updated second region of the environment around the second vehicle that is to be occupied by the second vehicle; and determining an updated instruction for controlling the first vehicle based at least in part on the updated second region of the environment.

5. A system comprising:

one or more processors; and one or more non-transitory computer-readable media storing instructions, that when executed by the one or more processors, cause the system to perform operations comprising:

receiving sensor data associated with an environment of a vehicle;

determining, based at least in part on the sensor data, a type of action performed at a future time by an object proximate the vehicle;

determining, based at least in part on the action, an entirety of time that the object performs the action;

determining that the type of action satisfies a temporal condition;

receiving, based at least in part on the sensor data and the type of action satisfying the temporal condition, a first region of the environment encompassing the object and that the object proximate the vehicle is likely to occupy at the future time for the entirety of time that the object performs the action, the action comprising a plurality of trajectories within the first region;

determining, based at least in part on the sensor data and the first region of the environment, a blocked region corresponding to the first region that the vehicle should not enter; and determining an instruction for controlling the vehicle based at least in part on the blocked region.

6. The system as claim 5 recites, the operations further comprising:

determining, based at least in part on the sensor data, a confidence score associated with an intent of the object; and determining that the confidence score meets or exceeds a threshold, wherein the first region of the environment is determined based at least in part on the intent, and wherein the action is associated with the intent.

7. The system as claim 5 recites, the operations further comprising:

determining, based at least in part on the sensor data, a plurality of intents of the object, wherein a first intent of the plurality of intents is associated with a first confidence score and a second intent of the plurality of intents is associated with a second confidence score;

determining that the first confidence score and the second confidence score meet or exceed a threshold;

determining a third region of the environment associated with the object that is to be occupied by the object while the object performs a first action associated with the first intent; and determining a fourth region of the environment associated with the object that is to be occupied by the object while the object performs a second action associated with the second intent, wherein the first region is determined based on at least one of the third region or the fourth region.

8. The system as claim 5 recites, the operations further comprising:

generating, based at least in part on the sensor data, an input comprising a top-down representation of the environment, wherein the top-down representation comprises a multi-channel image;

inputting the input into a convolutional neural network; and receiving the first region of the environment associated with the object from the convolutional neural network.

9. The system as claim 8 recites, the operations further comprising selecting the convolutional neural network based at least in part on the action.

10. The system as claim 5 recites, the operations further comprising determining an occupancy grid, wherein a tile associated with the occupancy grid is associated with a confidence score indicative of whether a portion of the environment is likely to be occupied by the object, and wherein the first region of the environment is defined based at least in part on the occupancy grid.

11. The system as claim 10 recites, the operations further comprising inputting the occupancy grid into a planner component associated with the vehicle to determine the instruction for controlling the vehicle.

12. The system as claim 5 recites, wherein the vehicle is an autonomous vehicle and wherein the instruction for controlling the vehicle comprises an instruction to cause the vehicle to at least one of:

decelerate;

stop;

perform a lane change; or send a signal to a remote operator.

13. The system as claim 5 recites, wherein determining the first region of the environment associated with the object is performed at a first time, the operations further comprising:

receiving, at a second time, updated sensor data;

determining, based at least in part on the updated sensor data and an associated intent, an updated first region of the environment associated with the object that is to be occupied by the object; and determining an updated instruction for controlling the vehicle based at least in part on the updated first region of the environment.

14. One or more non-transitory computer-readable media storing instructions, that when executed by one or more processors, cause the one or more processors to perform operations comprising:

receiving sensor data associated with an environment of a vehicle;

determining, based at least in part on the sensor data, an action performed at a future time by an object proximate the vehicle, wherein the action is a parallel parking maneuver;

determining, based at least in part on the action, an entirety of time that the object performs the action;

receiving, based at least in part on the sensor data, a first region of the environment encompassing the object and that the object proximate the vehicle is likely to occupy at the future time for the entirety of time that the object performs the action, the action comprising a plurality of trajectories within the first region;

determining, based at least in part on the sensor data and the first region of the environment, a blocked region corresponding to the first region that the vehicle should not enter; and determining an instruction for controlling the vehicle based at least in part on the blocked region.

15. The one or more non-transitory computer-readable media as claim 14 recites, the operations further comprising:

generating, based at least in part on the sensor data, an input comprising a top-down representation of the environment, wherein the top-down representation comprises a multi-channel image;

inputting the input into a convolutional neural network, wherein the convolutional neural network is selected based at least in part on the action; and receiving the first region of the environment associated with the object from the convolutional neural network.

16. The one or more non-transitory computer-readable media as claim 15 recites, wherein the convolutional neural network is trained based at least in part on:

receiving log data;

detecting, based at least in part on the log data, a second object that performs the action;

determining a start time associated with the action and a stop time associated with the action;

determining a third region of the environment occupied by the second object during a period of time between the start time and the stop time; and training the convolutional neural network based at least in part on the third region of the environment.

17. The one or more non-transitory computer-readable media as claim 14 recites, wherein the first region of the environment is determined based at least in part on the action and at least one other action, and wherein each action is associated with an intent that is associated with a confidence score that meets or exceeds a threshold.

18. The one or more non-transitory computer-readable media as claim 14 recites, the operations further comprising determining an occupancy grid, wherein a tile associated with the occupancy grid is associated with a confidence score indicative of whether a portion of the environment is likely to be occupied by the object, and wherein the first region of the environment is defined based at least in part on the occupancy grid.

19. The method of claim 1, wherein:

the plurality of trajectories includes at least one trajectory for a current time and at least one subsequent trajectory for the future time, and the instruction for controlling the first vehicle includes determining a trajectory for the first vehicle at the current time that avoids the blocked region.

20. The method of claim 1, wherein:

the maneuver includes at least one of:

parallel parking, a three-point turn, a U-turn, a K-turn, or an N-point turn, and the plurality of trajectories occur within the first region.

* * * * *